United States Patent
Fukuda et al.

[19]

[11] Patent Number: 6,070,708
[45] Date of Patent: Jun. 6, 2000

[54] TWIN-CLUTCH

[75] Inventors: Yoshinobu Fukuda; Koji Kajitani; Hiroshi Mizukami, all of Neyagawa, Japan

[73] Assignee: Exedy Corporation, Neyagawa, Japan

[21] Appl. No.: 08/934,519

[22] Filed: Sep. 22, 1997

[30] Foreign Application Priority Data

Sep. 25, 1996  [JP]  Japan ................................ 8-253433

[51] Int. Cl.[7] ............................. F16D 13/46; F16D 13/52
[52] U.S. Cl. .................................... 192/70.21; 192/70.28
[58] Field of Search ........................... 192/70.18, 70.19, 192/70.21, 70.28, 48.7, 89.23

[56] References Cited

U.S. PATENT DOCUMENTS

| | | | |
|---|---|---|---|
| 1,974,390 | 9/1934 | Eason ................................ | 192/70.21 X |
| 2,036,005 | 3/1936 | Wemp ................................ | 192/70.21 |
| 2,385,517 | 9/1945 | Hunt ................................ | 192/70.21 |
| 3,666,062 | 5/1972 | Riese ................................ | 192/70.28 |
| 3,871,499 | 3/1975 | Kazuma ........................... | 192/70.18 X |
| 4,368,810 | 1/1983 | Maucher et al. ................. | 192/70.28 |
| 4,431,097 | 2/1984 | Scheer ............................... | 192/70.18 |
| 4,437,555 | 3/1984 | Tomm et al. ..................... | 192/70.21 |
| 4,958,714 | 9/1990 | Cooke et al. ..................... | 192/70.25 X |
| 5,018,613 | 5/1991 | Nagano ............................ | 192/70.25 |
| 5,090,537 | 2/1992 | Fukuda ........................... | 192/70.18 X |
| 5,383,544 | 1/1995 | Patel ................................ | 192/70.28 |

FOREIGN PATENT DOCUMENTS 55-60728  5/1980  Japan ................................ 192/70.28

*Primary Examiner*—Charles A. Marmor
*Assistant Examiner*—Scott Lund
*Attorney, Agent, or Firm*—Shinjyu An Intellectual Property Firm

[57] ABSTRACT

In a twin-clutch, an intermediate plate is configured to be located reliably at a position intermediate a pressure plate and a flywheel. The annular intermediate plate 31 is disposed between first and second frictional coupling portions. A clutch cover assembly includes a clutch cover 4 fixed to the flywheel 1, a pressure plate 30 disposed near the second frictional coupling portion, and a diaphragm spring carried by the clutch cover 4 for biasing the pressure plate 30 toward the flywheel 1. Strap plates 35 couple the flywheel 1 to the intermediate plate 31, and bias the intermediate plate 31 away from the flywheel 1 when the clutch is engaged. Coil spring 42 is arranged in a compressed state between the pressure plate 30 and the intermediate plate 31, and has the substantially same spring constant as the strap plates 35.

7 Claims, 11 Drawing Sheets

TWIN-CLUTCH

BACKGROUND OF THE INVENTION

A. Field of the Invention

The present invention relates to a twin-clutch for an automobile or the like, and in particular to a twin-clutch having two frictional coupling portions and an intermediate plate interposed therebetween.

B. Description of the Background Art

A twin-clutch is generally used for ensuring a large torque transmission capacity within a limited space. In a twin-clutch there are typically two frictional coupling portions and an intermediate plate disposed between a flywheel and a pressure plate, so that a torque is transmitted from the flywheel to a clutch disk assembly through both the frictional coupling portions.

In the above described structure, it is important to control accurately the position and travel characteristics of the intermediate plate interposed between both the frictional coupling portions. For example, the intermediate plate must be kept at an intermediate position between the flywheel and the pressure plate when the clutch is released or disengaged. If the intermediate plate were brought into contact with one of the frictional coupling portions, a drag torque would occur.

Japanese Laid-Open Utility Model Publication No. 1-104436 (1989) discloses a structure developed in view of the above. In this structure, compressible conical coil springs are arranged between a flywheel and an intermediate plate located axially behind the flywheel, and another kind of compressible conical coil springs are also arranged between the intermediate plate and a pressure plate located axially behind the intermediate plate.

According to this structure, both kinds of the compressible conical coil springs act to hold continuously the intermediate plate at a position intermediate between the flywheel and the pressure plate.

In the twin-clutch, however, the intermediate plate is generally coupled to the flywheel by strap plates which extend in the circumferential direction of the disk. The strap plates act as coupling members for transmitting a rotary force of the flywheel to the intermediate plate, and also act as elastic members for axially releasing the intermediate plate from the flywheel. In the twin-clutch disclosed in the above publication, therefore, a load applied by the strap plates and a variation in this load may adversely affect the axial position of the intermediate plate which is to be kept by balanced loads of the two kinds of compressible coil springs. In other words, the position control characteristics for the intermediate plate are affected by both the axial elastic characteristics of the strap plates and the elastic characteristics of both the compressible coil springs, and therefore cannot be determined easily. As a result, the intermediate plate may shift toward the pressure plate or the flywheel from the position intermediate between them when the clutch is disengaged, and thereby the intermediate plate may come into contact with the first or second frictional coupling portion to generate a drag torque.

SUMMARY OF THE INVENTION

An object of the invention is to provide a structure for controlling an intermediate plate to be positioned reliably at an intermediate position between a pressure plate and a flywheel when a clutch is disengaged.

In accordance with one aspect of the present invention, a twin-clutch for attachment to a flywheel of an engine, includes a clutch disk assembly having a first frictional coupling portion configured to be disposed adjacent the flywheel, and a second frictional coupling portion disposed axially remote from the first frictional coupling portion. An annular intermediate plate is disposed between the first and second frictional coupling portions. The twin-clutch also includes a clutch cover assembly which has a clutch cover configured for attachment to the flywheel, a pressure plate disposed within the clutch cover adjacent to the second frictional coupling portion, and a biasing member supported on the clutch cover biasing the pressure plate toward the flywheel with the first frictional coupling portion. The annular intermediate plate and the second frictional coupling portion are disposed in order between the flywheel and the pressure plate. A first elastic member couples the flywheel and the intermediate plate together, and biasing the intermediate plate away from the flywheel in a clutch engagement state. A second elastic member is arranged in a compressed state between the pressure plate and the intermediate plate, and has substantially the same spring constant as the first elastic member.

Preferably, the first and second elastic members are configured to exhibit different deflection rates during movement from the clutch engagement state to a clutch disengagement state such that the first frictional coupling portion is released from torque transmission before the second frictional coupling portion.

Alternatively, the first and second elastic members are configured to exhibit different deflection rates during movement from the clutch engagement state to a clutch disengagement state such that the second frictional coupling portion is released from torque transmission before the first frictional coupling portion.

Preferably, the first elastic member is a strap plate extending between the flywheel and the intermediate plate, and the second elastic member is a coil spring disposed between the intermediate plate and the pressure plate.

Preferably, the clutch disk assembly further includes a hub assembly having a cylindrical engagement portion formed with a plurality of circumferentially spaced apart projections. The cylindrical engagement portion is formed with a plurality of circumferentially spaced apart recesses between groups of the projections. The second frictional coupling portion is further formed with a core plate having radially inwardly extending contact portions. The core plate is engaged with the projections in the hub assembly such that the second friction coupling portion rotates with the hub assembly but may undergo axial limited movement with respect to the hub assembly. The contact portions extend through the recesses. At least one elastic member is fixed to a radial outer side of said clutch disk assembly radially inward from the projections. The elastic member extends radially outward for engagement with the contact portions thereby limiting axial movement of the core plate of the second friction coupling portion. The elastic member is also positioned to bias the second friction coupling portion away from the flywheel in the clutch engagement state.

Preferably, the elastic member comprises a plurality of plates fixed to the cylindrical engagement portion of the hub assembly.

Alternatively, the elastic member comprises an annular plate fixed to the clutch disk assembly, the annular plate formed with a plurality of radially outwardly extending portions configured to engage the contact portions.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
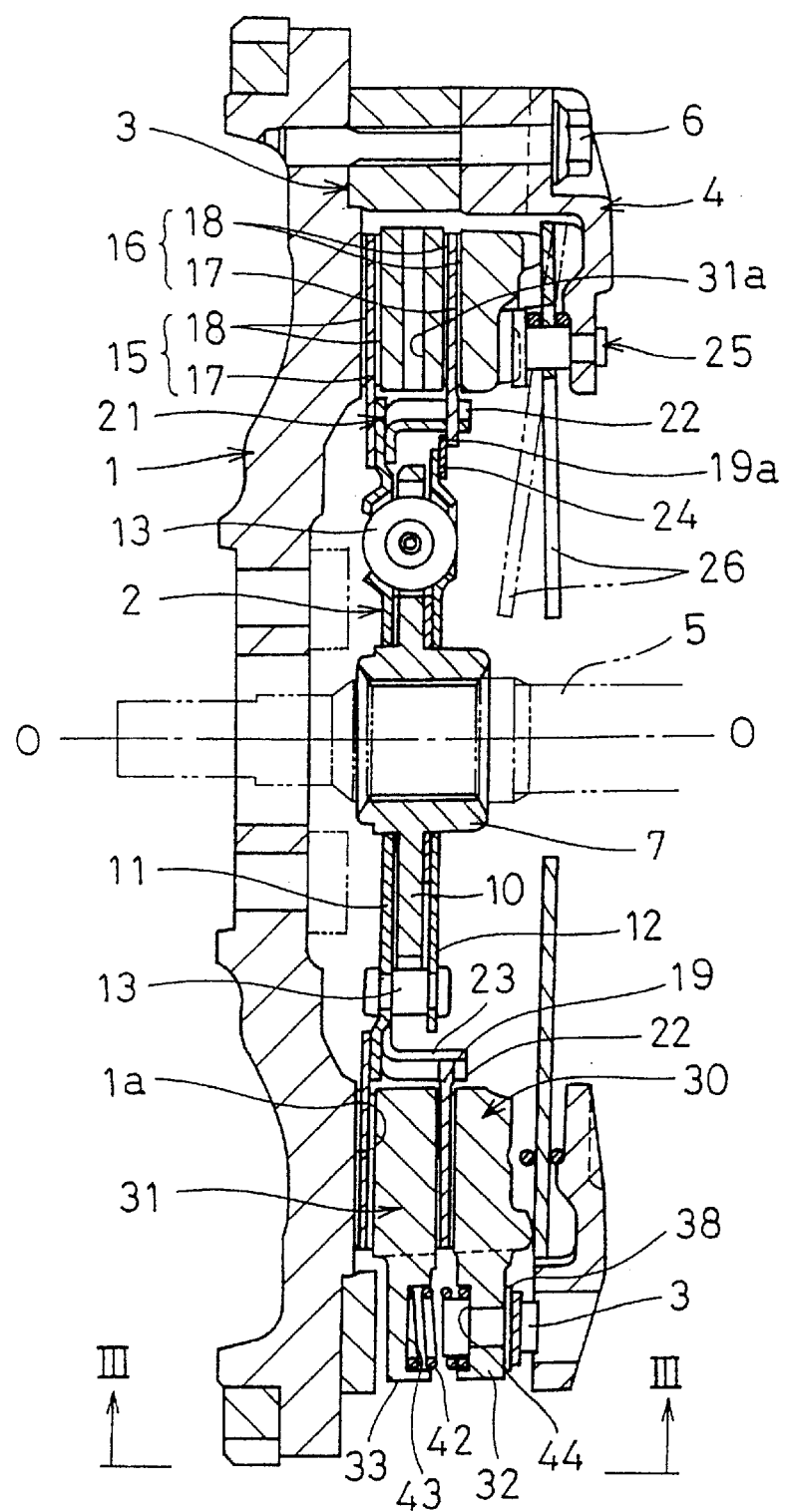
FIG. 1 is a side cross sectional view of a twin-clutch assembly in accordance with a first embodiment of the present invention, the twin-clutch having a flywheel, a first friction coupling portion, an intermediate plate, a second friction coupling portion and a pressure plate.
Figure 2:
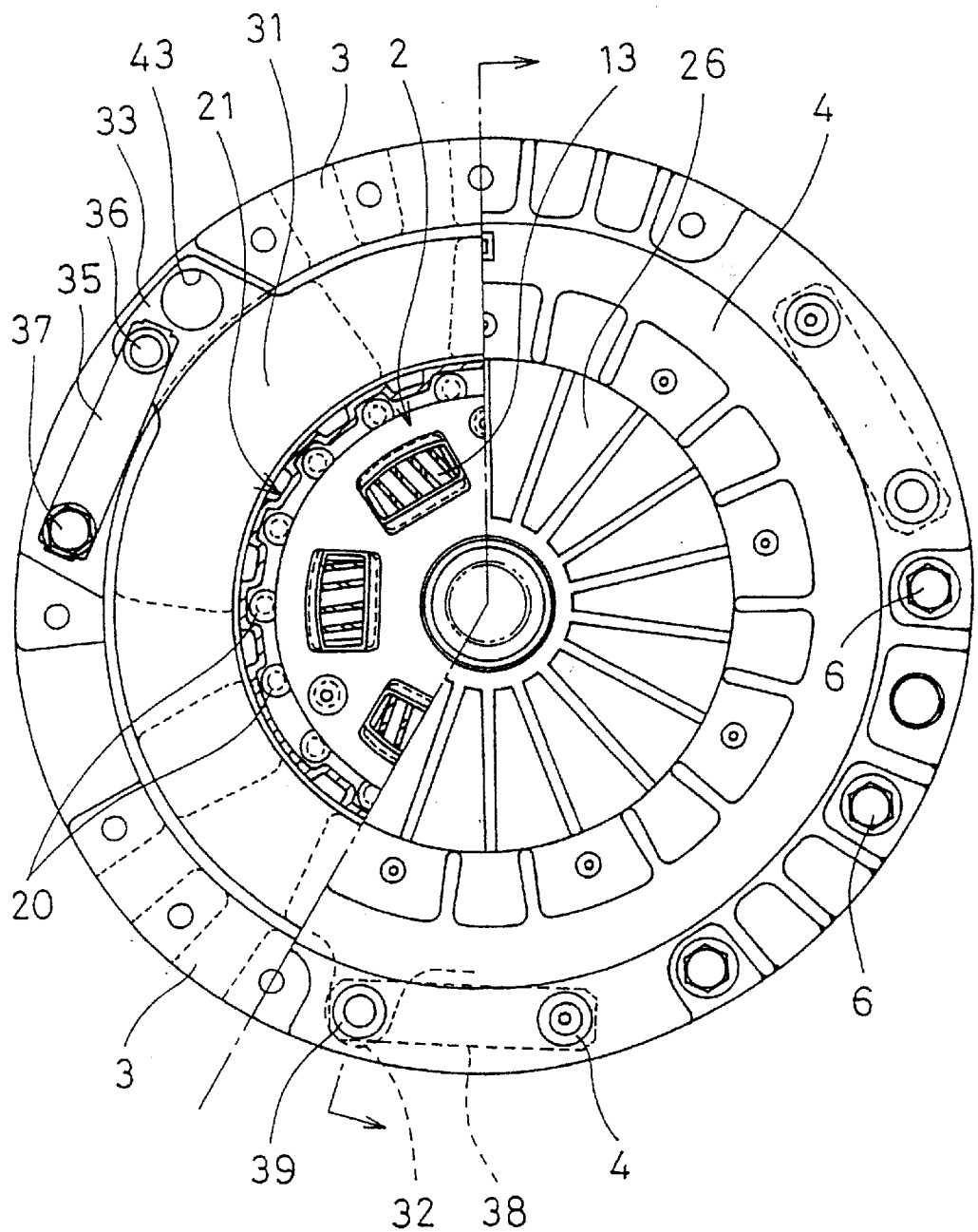
FIG. 2 is a part cutaway, part elevational view of the twin-clutch depicted in FIG. 1.

FIGS. 1 and 2 show aspects of the structure of a twin-clutch according with the present invention. The twin-clutch is attached to a flywheel 1 of an engine (not shown), and is basically formed of a clutch disk assembly 2, a clutch cover 4, a pressure plate 30 and an intermediate plate 31. In the following description with reference to FIG. 1, the left side of FIG. 1 will hereinafter be referred to as the engine side or an axially front side of the twin-clutch, and the right side of FIG. 1 will be referred to as the transmission side or axial rear side of the twin-clutch. The flywheel 1 is provided at a rear side of its radially outer portion with an annular flat friction surface 1a.

The clutch disk assembly 2 is disposed adjacent to the flywheel 1 of the engine. A flywheel ring 3 extends around a radially outward side the clutch disk assembly 2. The clutch cover 4 is fixed to the flywheel 1 with the flywheel ring 3 fitted therebetween. The clutch cover 4, the flywheel 1 and the flywheel ring 3 are arranged coaxially with respect to one another and also with respect to a clutch output shaft 5 (i.e., transmission input shaft). The flywheel ring 3 has three arc-shaped portions which project axially rearward and are circumferentially equally spaced from each other. Outer peripheral portions of the flywheel ring 3 and the clutch cover 4 are fixed to the flywheel 1 by a plurality of axial bolts 6. The bolts 6 extend through the arc-shaped portions of the flywheel ring 3. The flywheel ring 3 may alternatively be formed integrally with the flywheel 1.

The clutch disk assembly 2 is provided at a central portion thereof with a hub 7, which is spline-coupled to the clutch output shaft 5. First and second circular plates 11 and 12 produced by sheet metal working are arranged at axially opposite sides of a radial flange 10 of the hub 7, respectively, and are coupled to the flange 10 via coil springs 13. The first circular plate 11 is arranged near the flywheel 1, and the second circular plate 12 is arranged axially behind the first circular plate 11. Outer peripheral portions of the first and second circular plates 11 and 12 are fixed together by a plurality of stop pins 113.

Figure 4:
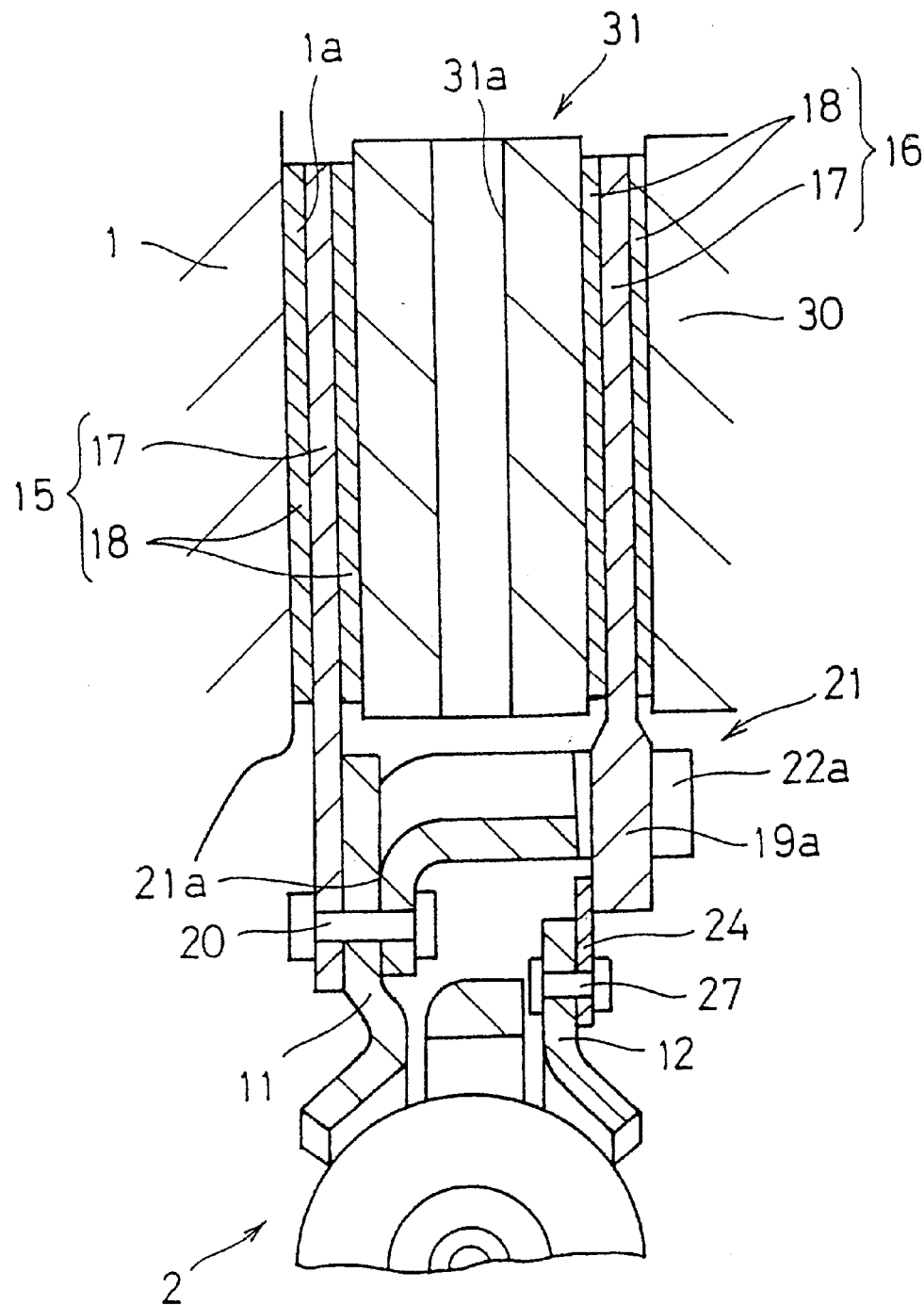
FIG. 4 is a fragmentary cross sectional view, showing an upper portion of FIG. 1, on an enlarged scale.

The clutch disk assembly 2 is further provided, as shown in FIG. 4, at its radially outer portion with first and second frictional coupling portions 15 and 16. The first frictional coupling portion 15 extends circumferentially around the first circular plate 11, and includes a core plate 17 and friction facings 18 which are fixed to the opposite sides of the core plate 17, respectively, and are made of sintered mixture of ceramics and metal. The core plate 17 extends radially inward beyond the friction facings 18, and has an inner peripheral portion fixed to the first circular plate 11 by a large number of rivets 20. The first frictional coupling portion 15 is located near the friction surface 1a of the flywheel 1.

Figure 6:
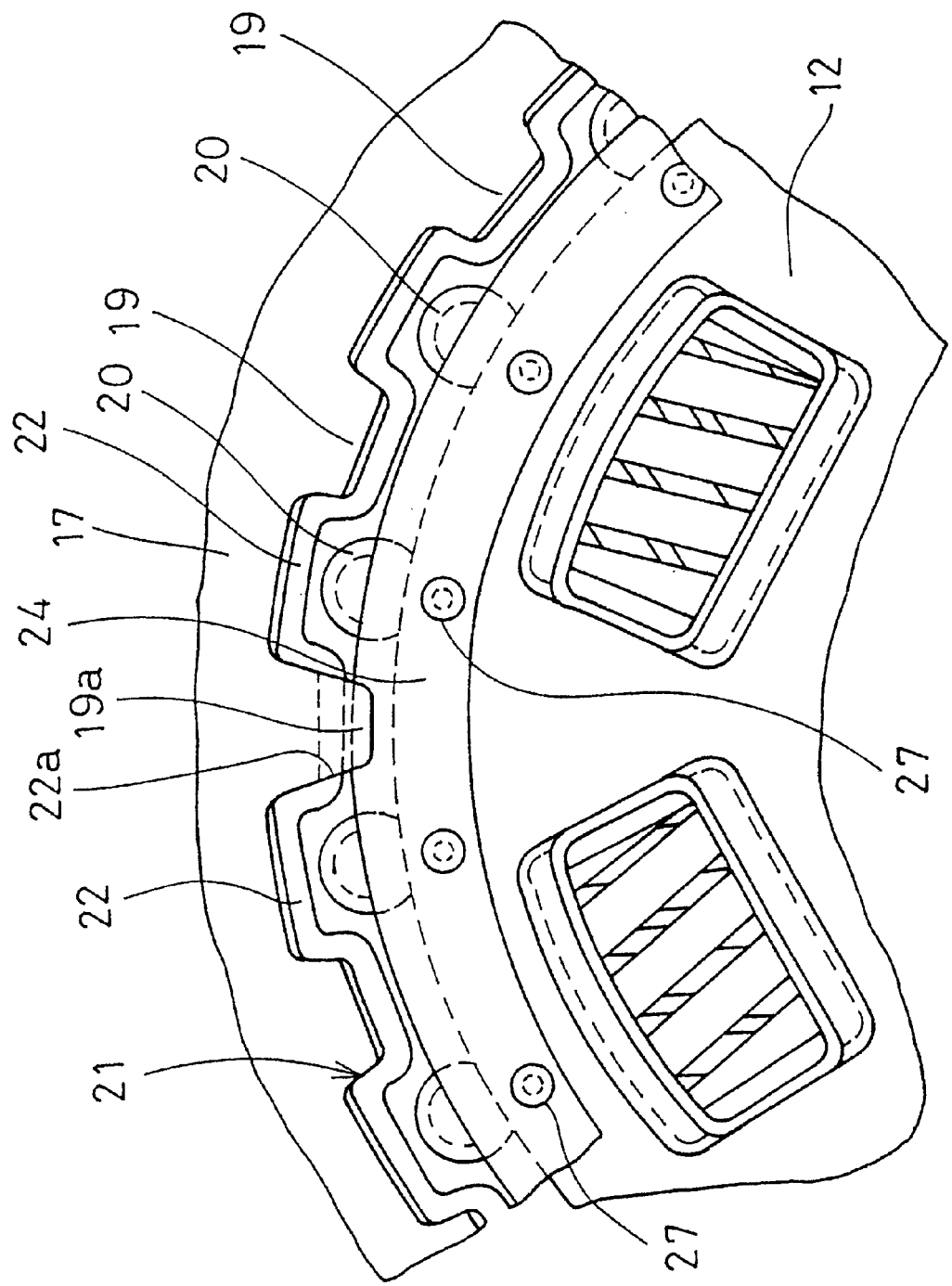
FIG. 6 is a fragmentary cutaway view similar to a portion of FIG. 2, on an enlarged scale, showing details of an elastic member.

The second frictional coupling portion 16 has the substantially same structure as the first frictional coupling portion 15, but differs therefrom in that, as shown in FIG. 6, the core plate 17 is provided at its inner periphery with a plurality of claw-like projections or inner teeth 19. The core plate 17 includes circumferentially equally spaced contact portions 19a which extend radially inward beyond the inner teeth 19.

An annular engagement portion 21 formed by sheet metal working is fixed to the outer peripheral portion of the first circular plate 11. More specifically, as shown in FIG. 4, the cylindrical engagement portion 21 is provided at its axially front end with a radially inward flange 21a, which is fixed to the outer peripheral portion of the first circular plate 11 by the rivets 20 together with the core plate 17 of the first frictional coupling portion 15. A cylindrical portion of the cylindrical engagement portion 21 has a tooth-like form shaped by press working. In other words, the cylindrical portion of the cylindrical engagement portion 21 is provided with a plurality of projections 22 which project radially outward.

Each projection 22 has an axially length sufficient such that the inner teeth 19 of the core plate 17 of the second coupling portion 16 are fitted between the projections 22, so that the second coupling portion 16 is axially movably and unrotatably coupled to the cylindrical engagement portion 21. The second frictional coupling portion 16 engages the cylindrical engagement portion 21 and can be removed therefrom by movement toward the transmission side or axial rear side of the twin clutch. As shown in FIGS. 4 and 6, the cylindrical portion of the cylindrical engagement portion 21 is provided at its axially rear end with a plurality of recesses 22a which are circumferentially equally spaced from each other. Each recess 22a is located between the projections 22 and has a predetermined axial length. The contact portions 19a formed at the core plate 17 of the second frictional coupling portion 16 extend radially inward beyond the recesses 22a.

An elastic member 24 which has an annular plate-like form, has an inner peripheral portion fixed to the outer peripheral portion of the second circular plate 12 by rivets 27, as is shown in FIG. 4. The outer peripheral portion of the elastic member 24 extends radially outward in the vicinity of the inner periphery of the cylindrical engagement portion 21. The contact portion 19a of the core plate 17 of the second frictional coupling portion 16 extends radially inward such that it can contact the axially front side of the outer peripheral portion of the elastic member 24. Thus, the free end of the contact portion 19a can come into contact with the axially front side of the portion (i.e., outer peripheral portion) of the elastic member 24 which is located radially outside the outer periphery of the second circular plate 12.

A fulcrum mechanism 25 includes a plurality of stud pins and two wire rings, and is arranged radially inside the clutch cover 4. The stud pins extend through apertures formed in the clutch cover 4. The fulcrum mechanism 25 supports a radially middle portion of a diaphragm spring 26. The diaphragm spring 26 has an inner peripheral portion coupled to a release bearing (not shown) and an outer peripheral portion contacts projections formed at the rear surface of the pressure plate 30. The clutch cover assembly, as a unit, includes the clutch cover 4, the pressure plate 30, the fulcrum mechanism 25, the diaphragm spring 26, among other features.

The pressure plate 30 is disposed opposite the flywheel 1 with the frictional coupling portions 15 and 16 interposed therebetween. Further, an intermediate plate 31 is arranged coaxially between the frictional coupling portions 15 and 16. The intermediate plate 31 has a plurality of apertures 31a extending radially therethrough.

Figure 3:
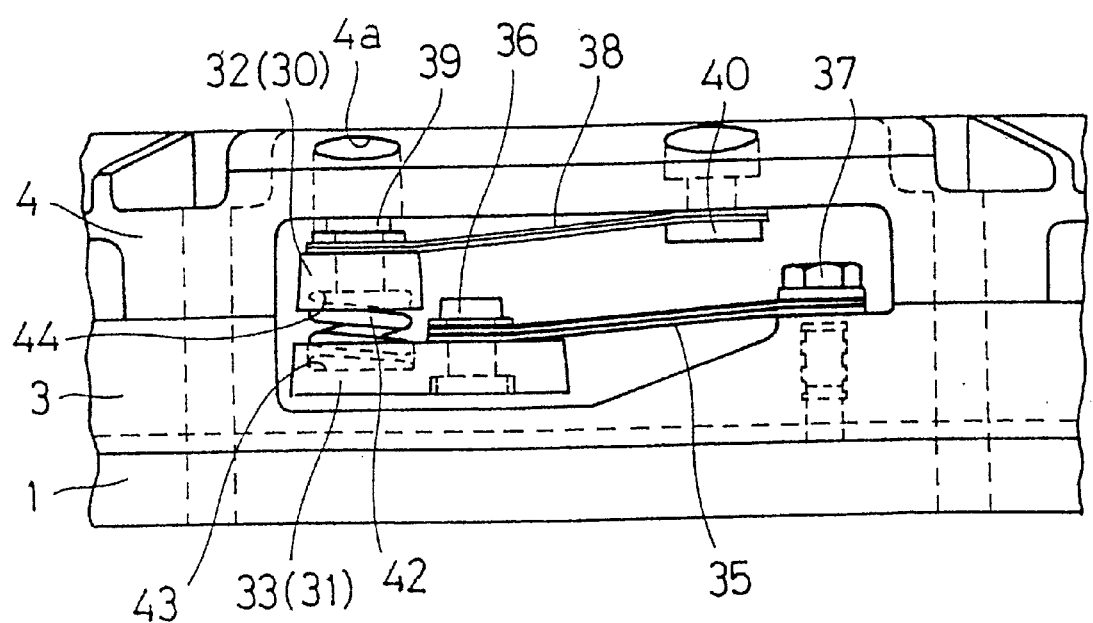
FIG. 3 is a side elevational view looking in the direction of arrows III—III in FIG. 1.

FIG. 3 is a view taken along line III—III in FIG. 1. The pressure plate 30 and the intermediate plate 31 each are provided with circumferentially equally spaced three bosses 32 and 33, respectively, which are formed at the outer peripheral portion thereof and project radially outward.

An end of a strap plate 35 (a first elastic member), extends in a tangential direction (i.e., substantially circumferential direction) with respect to the clutch, and is fixed to a rear surface of each boss 33 by a rivet 36. The other end of the strap plate 35 is fixed to the rear end surface of the flywheel ring 3 by a bolt 37. The strap plate 35 relatively unrotatably couples the intermediate plate 31 to the flywheel ring 3, and elastically biases the intermediate plate 31 in the clutch disengaging direction when the clutch is engaged and therefore the intermediate plate 31 is located near the flywheel 1.

An end of a strap plate 38 extending in the tangential direction of the clutch is fixed to the rear surface of the boss 32. The clutch cover 4 is provided with axial apertures 4a coaxial with the rivets 39, respectively. The other end of each strap plate 38 is fixed to the clutch cover 4 by a rivet 40. In this manner, the strap plate 38 relatively unrotatably couples the pressure plate 30 to the clutch cover 4.

Figure 5:
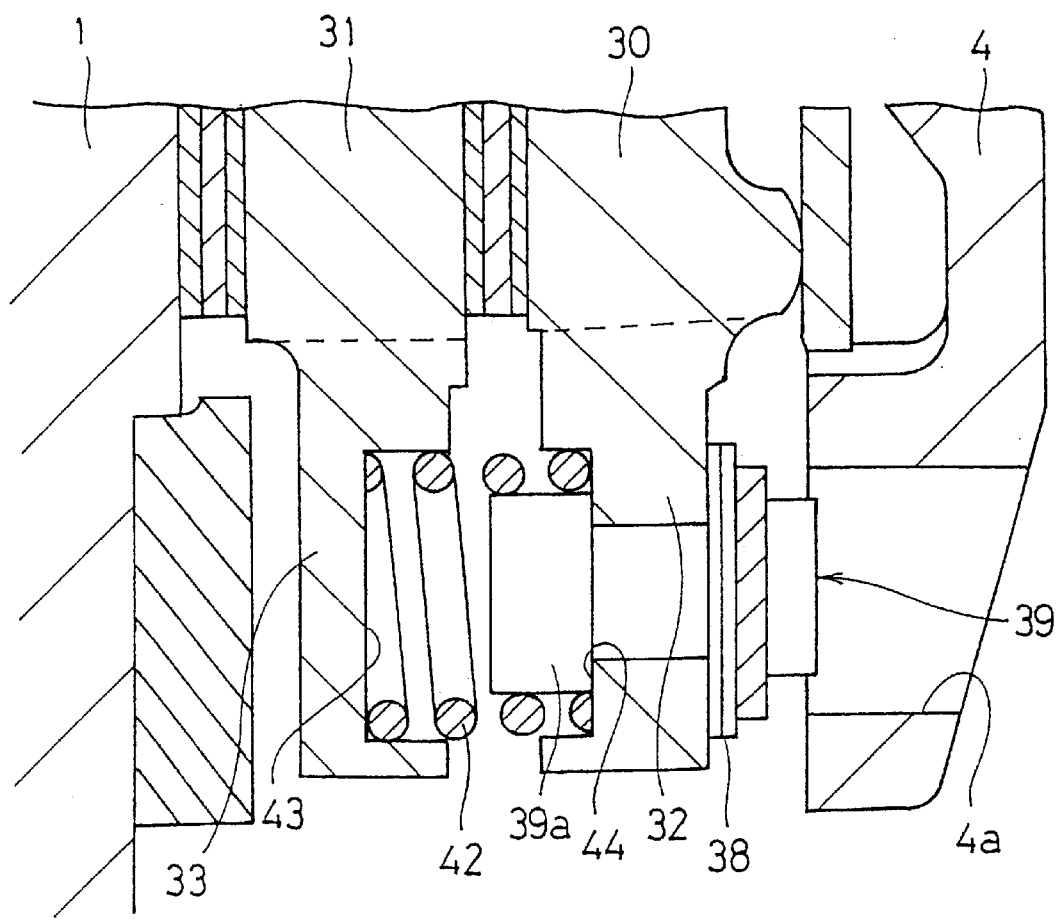
FIG. 5 is a fragmentary cross sectional view, showing a lower portion of FIG. 1, on an enlarged scale.

An axially compressed coil spring 42 (second elastic member) is disposed between each boss 32 and the adjacent boss 33. As can be seen from FIGS. 3 and 5, an end of the coil spring 42 is radially unmovably fitted into a concavity 43 formed at the rear surface of the boss 33. The other end of the coil spring 42 is located in a concavity 44 formed at the front surface of the boss 32, and is fitted around the head of the rivet 39, so that the other end is also radially unmovable.

The coil spring 42 and the strap plate 35 have the substantially same spring constants, and therefore deflect the substantially same axial distance when the clutch is engaged. Therefore, a balance is kept between a load applied to the intermediate plate 31 by the coil springs 42 and a load applied thereto by the strap plates 35.

Assembly Operation

For assembling a twin-clutch having the above described structure, the clutch disk assembly 2 except for the second frictional coupling portion 16 is formed by assembling the aforementioned parts and members, and then is positioned with respect to the flywheel 1. Then, the flywheel ring 3 and the intermediate plate 31, which are coupled together by the strap plates 35, as well as the coil springs 44, the second frictional coupling portion 16 and the clutch cover assembly are successively located with respect to the first frictional coupling portion 15 in an overlapping or stacking manner, and are fixed together. Therefore, no disadvantage arises with respect to assembling of the intermediate plate 31 and the other parts and portions.

Clutch Engagement State

When the clutch is engaged, the pressure plate 30 biased by the diaphragm spring 26 presses the second frictional coupling portion 16 to the intermediate plate 31, which in turn presses the first frictional coupling portion 15 to the flywheel 1.

In the clutch engagement state, a balance is kept between the force applied in the clutch disengaging direction to the intermediate plate 31 by the strap plates 35 and the force applied in the opposite direction to the intermediate plate 31 by the coil springs 42 as already described. Therefore, the force applied from the first frictional coupling portion 15 to the flywheel 1 and the intermediate plate 31 is generally equal to the force applied from the second frictional coupling portion 16 to the intermediate plate 31 and the pressure plate 30. Accordingly, all the friction facings 18 of the first and second frictional coupling portions 15 and 16 can uniformly and efficiently transmit the torque, and therefore can transmit a large torque as a whole.

In the clutch engagement state, the contact portions 19a of the core plate 17 of the second frictional coupling portion 16 elastically and slightly deform the elastic member 24 toward the flywheel 1. A predetermined axial space is defined between the bottom of each recess 22a at the cylindrical engagement portion 21 and the contact portion 19a.

Clutch Disengagement Operation

When the inner peripheral portion of the diaphragm spring 26, which is in the clutch engaging position shown by solid line in FIG. 1, is pushed by the release bearing (not shown) into a state shown by alternate long and two short dashes line in FIG. 1, the pressing force applied to the pressure plate 30 by the diaphragm spring 26 is released. Thereby, the pressing forces against the first and second frictional coupling portions 15 and 16 are released, and the clutch is disengaged.

When the clutch is disengaged in this manner, the strap plates 38 pull the pressure plate 30 to an axially rearward position. Since the strap plates 35 and the coil springs 42 have the same spring constant, and further are initially deflected by the same distance, a lift of the intermediate plate, i.e., an axial distance which the intermediate plate 31 moves rearward with respect to the flywheel 1 during the clutch disengagement operation, is generally always half the lift of the pressure plate 30. As a result, the intermediate plate 31 is kept at a position substantially intermediate the flywheel 1 and the pressure plate 30 when the clutch is disengaged and while the clutch is being disengaged or engaged. Therefore, so long as the diaphragm spring 26 is sufficiently moved, complete disengagement of the twin-clutch is assured. In other words, friction contact between the flywheel 1, the intermediate plate 31 and the first frictional coupling portion 15 generally prevented in a clutch disengagement state and likewise friction contact between the intermediate plate 31, the pressure plate 30 and the second frictional coupling portion 16 is generally prevented in a clutch disengagement state.

When the clutch is disengaged, the elastic member 24 restricts the movement of the second frictional coupling portion 16 toward the intermediate plate 31. This prevents undesirable drag torque.

Figure 7:
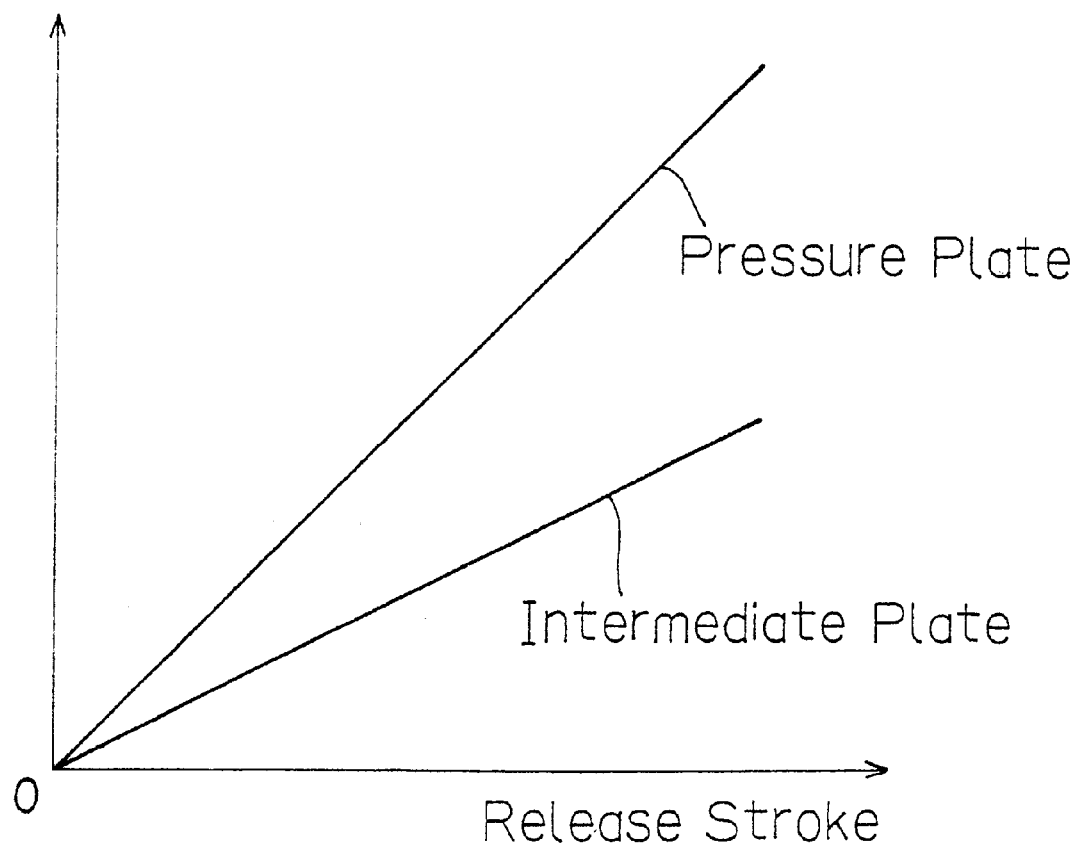
FIG. 7 is a graph showing a relationship between lift displacement of the pressure plate, the intermediate plate in response to a release stroke (movement of a diaphragm spring) in accordance with the first embodiment of the present invention.

Movements of the pressure plate 30 and the intermediate plate 31 during clutch disengagement are shown in the graph FIG. 7, where the movement of the diaphragm spring 26 allows movement of the pressure plate 30 and the intermediate plate 31. Movement or lift of the pressure plate 30 and the intermediate plate 31 is along the y-axis and the release stroke of the diaphragm spring 26 is indicated on the x-axis of the graph in FIG. 7.

Clutch Engagement Operation

When the diaphragm spring 26 in the aforementioned disengagement position is restored to the engagement position shown by the solid line in FIG. 1 by operating the unillustrated release bearing, the pressure plate 30 biased by the diaphragm spring 26 presses the second frictional coupling portion 16 to the intermediate plate 31, which in turn presses the first frictional coupling portion 15 to the flywheel 1.

In this clutch engaging operation, the second frictional coupling portion 16 moves along the projections 22 of the cylindrical engagement portion 21, and at the same time the contact portions 19 elastically deforms the elastic member 24. This prevents sudden increase in pressing force between the pressure plate 30 and the second frictional coupling portion 16, and the elastic member 24 absorbs a shock which occurs at the start of pressing. As a result, an operator can easily control the engaging and disengaging operations.

Second Embodiment

Figure 8:
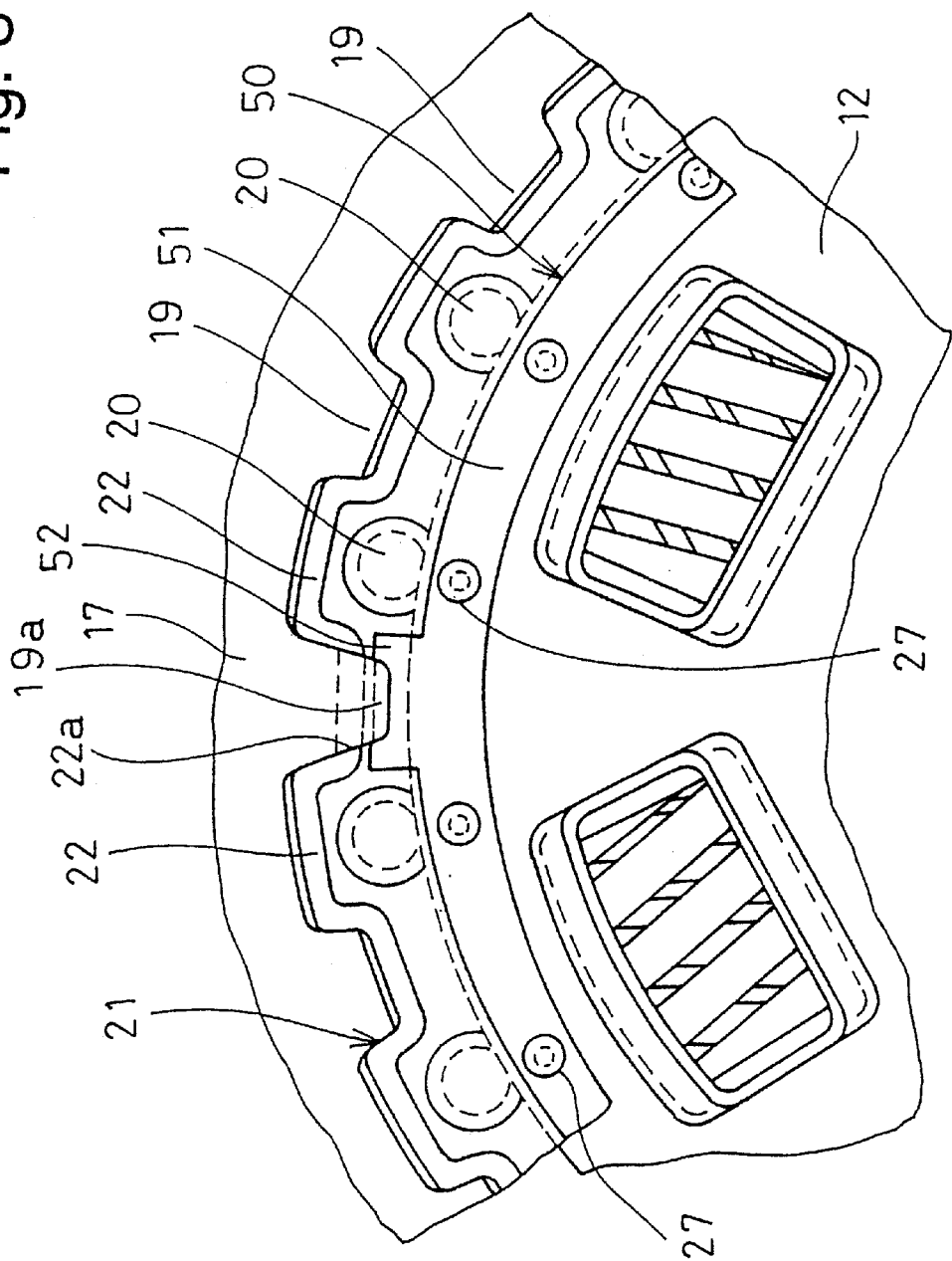
FIG. 8 is a fragmentary elevational view similar to FIG. 6, showing details of a twin-clutch assembly in accordance with a second embodiment of the present invention.

An elastic member 50 shown in FIG. 8 has an annular portion 51 fixed to the outer peripheral portion of the second circular plate 12 by rivets 27 and a plurality of projections 52 projected radially outward from the annular portion 51. The projections 52 are axially opposed to the contact portions 19a, respectively. The elastic member 50 with the projections 52 has generally the same function as the elastic member 24 described above with respect to the first embodiment shown in FIGS. 1–6.

Third Embodiment

Figure 9:
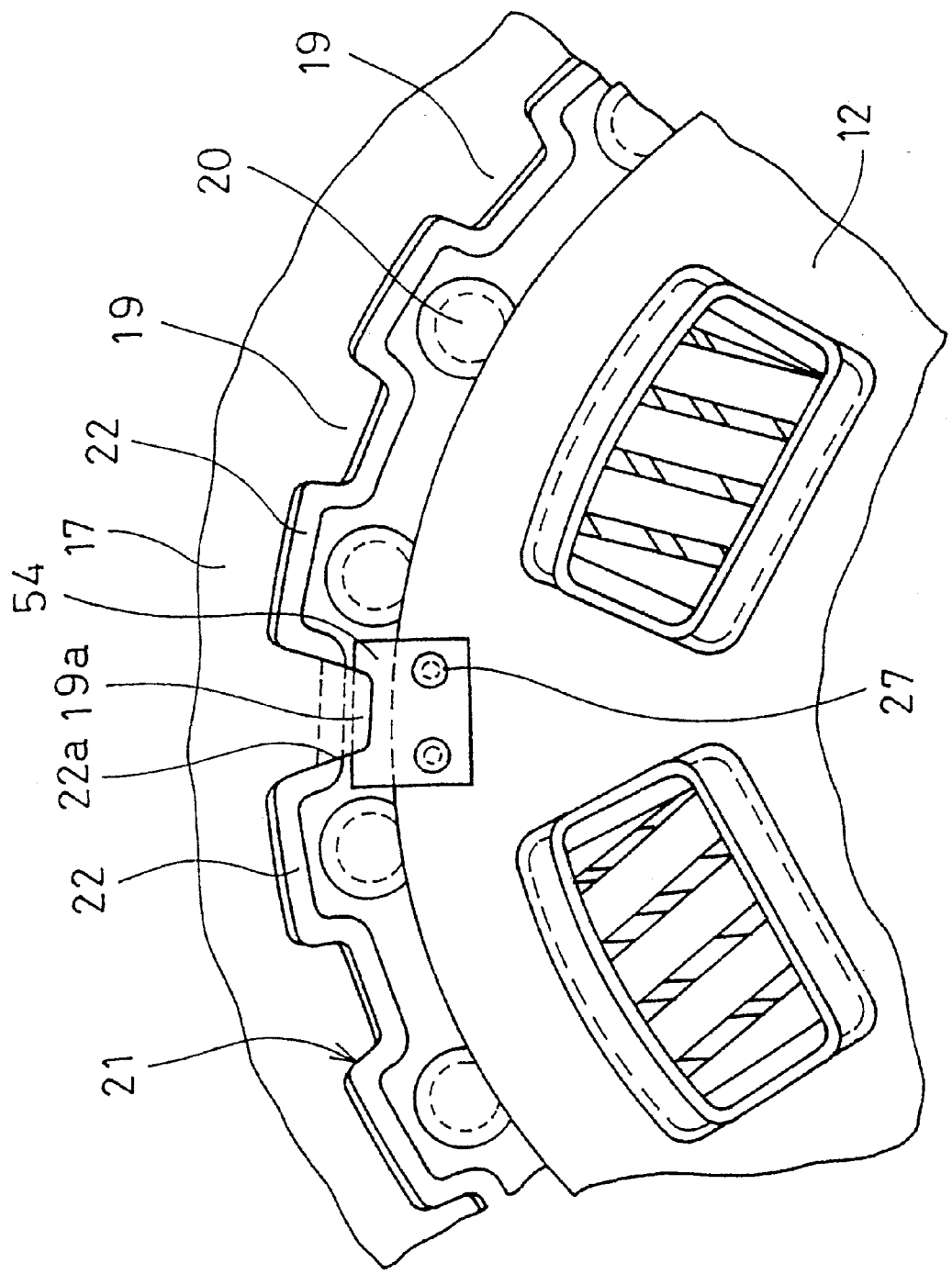
FIG. 9 is a fragmentary elevational view similar to FIGS. 6 and 8, showing details of a twin-clutch assembly in accordance with a third embodiment of the present invention.

A plurality of elastic plate members 54 shown in FIG. 9 are disposed along the outer periphery of the second circular plate 12 with a circumferentially equal space between each other. Each elastic member 54 is fixed to the circular plate 12 by the rivet 27. The elastic members 54 are axially opposed to the contact portions 19a, respectively. The elastic plate members 54 have generally the same function as the elastic member 24 described above with respect to the first embodiment shown in FIGS. 1–6.

Fourth Embodiment

In the initial stage during the clutch engagement operation, the deflection distance of the strap plate 35 may be different from that of the coil spring 42. Thereby, the intermediate plate 31 may be biased in such a way is to cause it to be located at a position shifted toward either the flywheel 1 or the pressure plate 30 and thereby cause transmission of a small amount of torque when the release stroke is small. Thus, the transmitted torque gradually increases while the clutch is being engaged. The following fourth and fifth embodiments relate to such configurations. In the clutch engaging characteristics during the clutch engaging operation can be changed by changing the aforementioned deflection distances of the elastic and spring elements.

Figure 10:
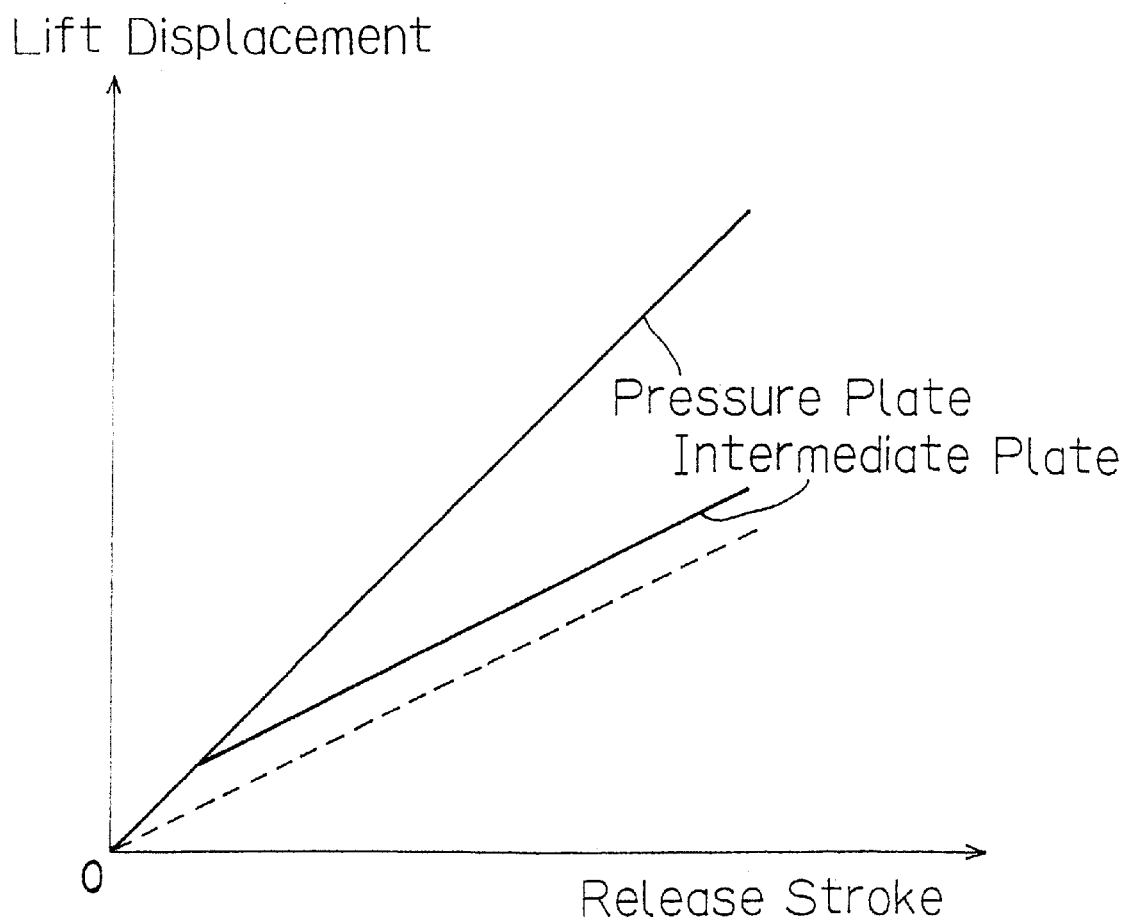
FIG. 10 is a graph showing a relationship between lift displacement of the pressure plate, the intermediate plate in response to a release stroke (movement of a diaphragm spring) in accordance with the fourth embodiment of the present invention.

An end of the strap plate 35, which is fixed to the boss 33 of the intermediate plate 31 in the first embodiment, is located at a position shifted forward from that in the first embodiment. As a result, the deflection distance of the strap plate 35 exceeds the deflection distance of the coil spring 42. In this case, the load applied from the strap plates 35 to the intermediate plate 31 exceeds the load applied from the coil springs 42. While the clutch is being disengaged, the intermediate plate 31 is initially pulled by the same distance as the pressure plate 30, as shown in FIG. 10. After the deflection distance of the strap plate 35 becomes equal to the deflection distance of the coil spring 42, the intermediate plate 31 is always pulled by the distance equal to half the distance or lift of the pressure plate 30. Therefore, the intermediate plate 31 is kept at the substantially intermediate position between the flywheel 1 and the pressure plate 30 when the clutch is disengaged.

According to the above characteristics, when the release stroke is small, the intermediate plate 31 and the pressure plate 30 are pulled by the equal distances, so that the second frictional coupling portion 16 is held between the intermediate plate 31 and the pressure plate 30. In this state, the intermediate plate 31 and the pressure plate 30 transmit the torque to the clutch disk assembly 2.

Fifth Embodiment

Figure 11:
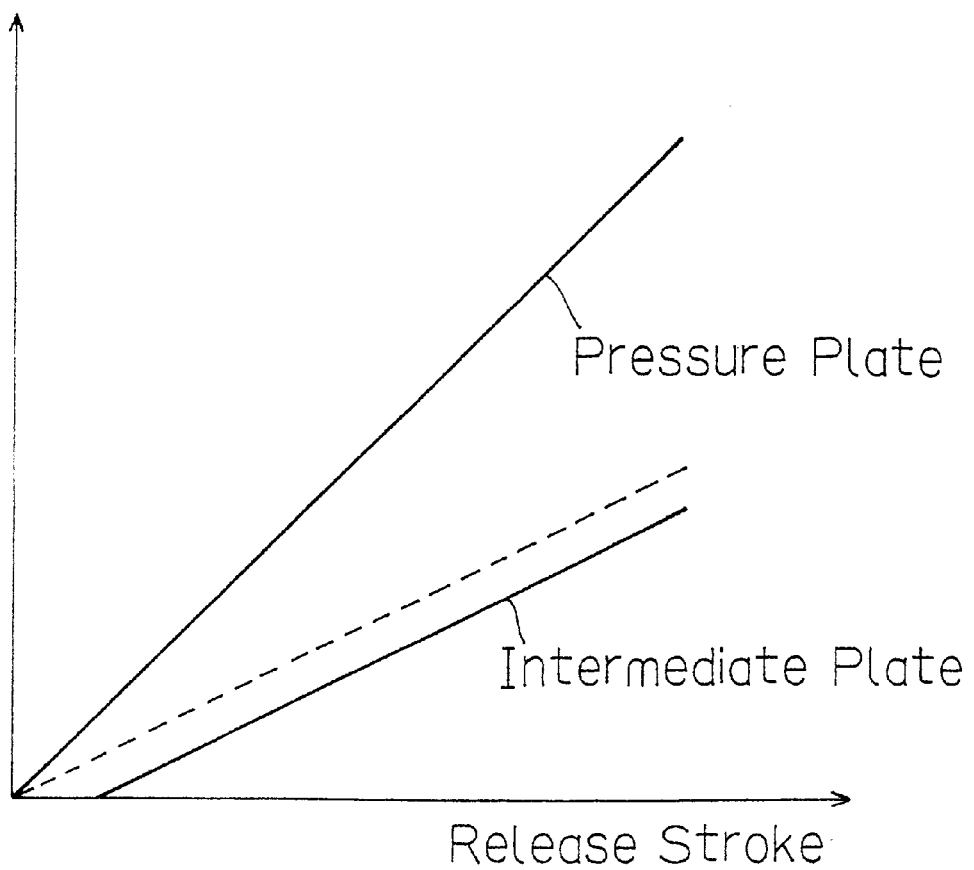
FIG. 11 is a graph showing a relationship between lift displacement of the pressure plate, the intermediate plate in response to a release stroke (movement of a diaphragm spring) in accordance with the fifth embodiment of the present invention.

An end of the strap plate 35, which is fixed to the boss 33 of the intermediate plate 31 in the first embodiment, is located at a position shifted rearward from that in the first embodiment. As a result, the deflection distance of the strap plate 35 becomes smaller the deflection distance of the coil spring 42. In this case, the load applied from the strap plate 35 to the intermediate plate 31 is smaller than the load applied from the coil springs 42. In the clutch disengaging operation, the intermediate plate 31 hardly moves axially in the initial stage, as shown in FIG. 11. After the deflection distance of the strap plate 35 becomes equal to that of the coil spring 42, the intermediate plate 31 is always pulled by the distance equal to half the distance or lift of the pressure plate 30. As a result, the intermediate plate 31 is substantially accurately held at the intermediate position between the flywheel 1 and the pressure plate 30 when the clutch is completely disengaged.

According to the above characteristics, when the release stroke is small, the intermediate plate 31 is hardly shifted, so that the first frictional coupling portion 15 is held between the intermediate plate 31 and the flywheel 1. In this state, the intermediate plate 31 and the pressure plate 30 transmit the torque to the clutch disk assembly 2.

According to the invention, as described above, the first elastic member coupling the flywheel and the intermediate plate together is substantially equal to the spring constant of the second elastic member disposed between the pressure plate and the intermediate plate. Therefore, the intermediate plate is located at the intermediate position between the pressure plate and the flywheel. As a result, the intermediate plate is restrained from coming into contact with the first and second frictional coupling portions.

The fourth and fifth embodiments described above may also be accomplished by, for example, manipulating the length of the coil springs 42 or changing the depth of the concavity 43. Although the offset or changing of biasing characteristics of the strap plates, as described above, is the preferred configuration.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A twin-clutch for attachment to a flywheel of an engine, comprising:
    a clutch disk assembly having a first frictional coupling portion configured to be disposed adjacent the flywheel, and a second frictional coupling portion disposed axially remote from said first frictional coupling portion;
    an annular intermediate plate disposed between said first and second frictional coupling portions, said intermediate plate being formed with a first recess on a radially outer portion thereof;
    a clutch cover assembly including a clutch cover configured for attachment to said flywheel, a pressure plate disposed within said clutch cover adjacent to said second frictional coupling portion, said pressure plate being formed with a second recess on a radially outer portion thereof, said second recess being axially aligned with said first recess and said second recess being open toward said first recess, said second recess having a rivet inserted therein concentric therewith, and a diaphragm spring supported on said clutch cover biasing said pressure plate toward the flywheel with said first frictional coupling portion, said annular intermediate plate and said second fictional coupling portion disposed in order between the flywheel and said pressure plate;
    a first elastic member connected to the flywheel and connected to said intermediate plate, and biasing said intermediate plate away from the flywheel in a clutch engagement state;
    a second elastic member arranged in a compressed state between said pressure plate and said intermediate plate, said second elastic member being a coil spring and having substantially the same spring constant as said first elastic member, said send elastic member extending into said first recess and also extending into said second recess, said second elastic member being retained in said second recess in said pressure plate by said rivet; and
    a third elastic member connected to said pressure plate and connected to said clutch cover limiting axial movement therebetween.

2. The twin-clutch according to claim 1, wherein said first and second elastic members are configured to exhibit different deflection rates during movement from the clutch engagement state to a clutch disengagement state such that said first frictional coupling portion is released from torque transmission before said second frictional coupling portion.

3. The twin-clutch according to claim 1, wherein said first and second elastic members are configured to exhibit different deflection rates during movement from the clutch engagement state to a clutch disengagement state such that said second frictional coupling portion is released from torque transmission before said first frictional coupling portion.

4. The twin-clutch according to claim 1, wherein said first elastic member is a strap plate extending between the flywheel and said intermediate plate, and said third elastic member is a strap plate extending between said pressure plate and said clutch cover.

5. The twin-clutch according to claim 1, wherein said clutch disk assembly further comprises:
    a hub assembly having a cylindrical engagement portion formed with a plurality of circumferentially spaced apart projections, said cylindrical engagement portion further formed with a plurality of circumferentially spaced apart recesses between groups of said projections;
    said second frictional coupling portion being further formed with a core plate having radially inwardly extending contact portions, said core plate being engaged with said projections in said hub assembly such that said second frictional coupling portion rotates with said hub assembly but may undergo axial limited movement with respect to said hub assembly, said contact portions extending through said recesses; and
    at least one fourth elastic member fixed to a radial outer side of a circular plate of said hub assembly radially inward from said projections, said fourth elastic member extending radially outward for engagement with said contact portions thereby limiting axial movement of said core plate of said second frictional coupling portion, said fourth elastic member being positioned to bias said second frictional coupling portion away from the flywheel in the clutch engagement state.

6. The twin-clutch according to claim 5, wherein said fourth elastic member comprises a plurality of plates fixed to said circular plate of said hub assembly.

7. The twin-clutch according to claim 5, wherein said fourth elastic member comprises an annular plate fixed to said circular plate of said hub assembly, said annular plate formed with a plurality of radially outwardly extending portions configured to engage said contact portions.

* * * * *